“β-lactone”

United States Patent Office
3,492,315
Patented Jan. 27, 1970

3,492,315
PRODUCTION OF α,α-DISUBSTITUTED-β PROPIOLACTONES
Masataka Nakahara, Takatsuki, Japan, assignor to Kanegafuchi Boseki Kabushiki Kaisha, Tokyo, Japan
No Drawing. Filed July 31, 1967, Ser. No. 657,024
Claims priority, application Japan, Aug. 20, 1966, 41/54,889
Int. Cl. C07d 3/00
U.S. Cl. 260—343.9                4 Claims

ABSTRACT OF THE DISCLOSURE

α,α-Disubstituted-β-propiolactones are prepared by the catalytic thermal decomposition or pyrolysis of β-acyloxy-α,α-disubstituted propionic acids, according to the scheme:

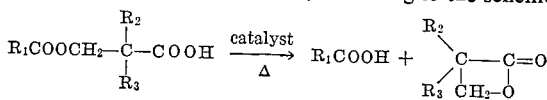

wherein $R_1$ is H, methyl or ethyl, $R_2$ is alkyl of at most 4 carbon atoms, and $R_3$ is alkyl of at most 4 carbon atoms or phenyl. The reaction temperature ranges from 150 to 500° C. The catalyst is an organic acid salt.

---

The present invention relates to a process for preparing α,α-disubstituted-β-propiolactones of the general formula:

(I)

characterized by the thermal decomposition or pyrolysis of β-acyloxy-α,α-disubstituted-propionic acids of the general formula:

(II)
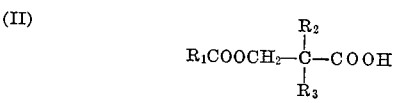

wherein $R_1$ represents a hydrogen atom or an alkyl group of 1 to 2 carbon atoms, $R_2$ represents an alkyl group of 1 to 4 carbon atoms and $R_3$ represents an alkyl group of 1 to 4 carbon atoms or phenyl group, in the presence of an organic acid salt as a catalyst.

The α,α-disubstituted-β-propiolactones are useful in the high polymer industry as the starting material of synthetic resins and synthetic fibers and also in the pharmaceutical industry and have been heretofore prepared by a variety of methods. For example, in the specification of U.S. Patent No. 2,356,459 there is described the well-known method for preparing α,α-dimethyl-β-propiolactone by the addition reaction of dimethylketone and formaldehyde, and also in the specification of German Patent No. 1,167,809 there is described a method for preparing the said lactone by reacting monohalopivalic acid with an equimolar amount of a metal base at 100 to 300° C. in a solvent of a high-boiling point. In addition, in the specification of Canadian Patent No. 549,347 there is described a method for preparing α,α-bis(chloromethyl)-β-propiolactone by thermal decomposition of silver β,β′,β″-trichloropivalate.

However, these known methods can be practiced on an industrial scale only with difficulties and involve many economical disadvantages.

We have discovered a simple process for preparing α,α-disubstituted-β-propiolactone which is essentially different from the above-mentioned methods. Thus, we have found that the decarboxylation by the thermal decomposition of β-acyloxy-α,α-disubstituted-propionic acid results in the formation of α,α-disubstituted-β-propiolactone.

We have also found that this decarboxylating thermal decomposition is promoted when conducted in the presence of a catalyst selected from organic acid salts.

The reaction of this invention may be illustrated by the following equation:

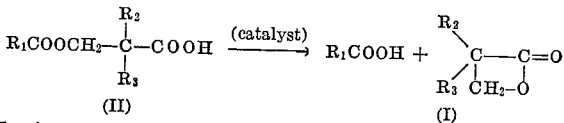

In the above formulae, $R_1$ represents a hydrogen atom or an alkyl group of 1 to 2 carbon atoms, $R_2$ represents an alkyl group of 1 to 4 carbon atoms and $R_3$ represents an alkyl group of 1 to 4 carbon atoms or phenyl group.

The reaction of the present invention producing α,α-disubstituted-β-propiolactones (hereinafter referred to as "β-lactone") from β-acyloxy-α,α-disubstituted-propionic acids may be carried out in a gaseous or liquid phase. Thus the reaction may be practiced by passing the starting material, preferably under reduced pressure, through a layer of the catalyst kept at a high temperature. The process is advantageous in that the reactant and the product are kept at the high temperature only for a short time, the concentration of the reactant is low and the continuous operation is possible. Alternatively, the starting materials is melted and thermally decomposed under heating and in the presence of the catalyst. The reaction may also be conducted by heating the starting material in an inert liquid medium having a high boiling point in the presence of the catalyst. Examples of such liquid medium are liquid paraffin, aromatic hydrocarbons, ethers, silicone oils, dibutyl phthalate, dioctyl phthalate, chlorobiphenyl, etc.

Example of the starting propionic acids of the formula (II) are

β-formyloxy-α,α-dimethylpropionic acid,
β-formyloxy-α,α-diethylpropionic acid,
β-formyloxy-α-butyl-α-phenylpropionic acid,
β-formyloxy-α-ethyl-α-propylpropionic acid,
β-formyloxy-α-propyl-α-phenylpropionic acid,
β-formyloxy-α,α-dipropylpropionic acid,
β-formyloxy-α-propyl-α-butylpropionic acid,
β-formyloxy-α,α-dibutylpropionic acid,
β-formyloxy-α-methyl-α-phenylpropionic acid,
β-formyloxy-α-ethyl-α-phenylopropionic acid,
β-acetoxy-α,α-dimethylpropionic acid,
β-acetoxy-α,α-diethylpropionic acid,
β-acetoxy-α-methyl-α-ethylpropionic acid,
β-acetoxy-α-methyl-α-propylpropionic acid,
β-propionyloxy-α,α-dimethylpropionic acid,
β-propionyloxy-α-methyl-α-propylpropionic acid,
β-acetoxy-α-methyl-α-butylpropionic acid,
β-acetoxy-α-methyl-α-phenylpropionic acid,
β-acetoxy-α-ethyl-α-butylpropionic acid,
β-acetoxy-α-ethyl-α-phenylpropionic acid,
β-propionyloxy-α,α-dimethylpropionic acid,
β-propionyloxy-α-methyl-α-ethylpropionic acid, etc.

Examples of the β-lactones of the Formula I to be obtained by the method of this invention are α,α-dimethyl-β-propiolactone,
α-methyl-α-ethyl-β-propiolactone,
α-methyl-α-propyl-β-propiolactone,
α,α-diethyl-β-propiolactone,
α-ethyl-α-propyl-β-propiolactone,
α,α-dipropyl-β-propiolactone,
α-propyl-α-butyl-β-propiolactone,
α,α-dibutyl-β-propiolactone,
α-ethyl-α-butyl-β-propiolactone,
α-methyl-α-phenyl-β-propiolactone,
α-ethyl-α-phenyl-β-propiolactone,
α-methyl-α-butyl-β-propiolactone,
α,α-diethyl-β-propiolactone, α-ethyl-α-propyl-β-propiolactone,
α-ethyl-α-butyl-β-propiolactone,
α-propyl-α-phenyl-β-propiolactone,
α-butyl-α-phenyl-β-propiolactone, etc.

The reaction temperature of the present process may range from 150 to 500° C., preferably from 200 to 300° C. Generally, the reaction does not proceed when the temperature is too low, while side reaction increases when the temperature is too high.

The present reaction may be carried out preferably under reduced pressure, although atmospheric pressure may be employed. The pressure significantly affects the reaction and has connection with change of the produced β-lactone. The pressure may range usually from 1 to 760 mm. Hg, preferably from 1 to 100 mm. Hg.

The reaction is preferably conducted in the presence of a substantially inert substance such as an inert gas (e.g., nitrogen, carbon dioxide, etc.) and an inert hydrocarbon (e.g., benzene, toluene, xylene, decaline, naphthalene, etc.). The presence of such inert substance is useful under reduced or atmospheric pressure. When a large amount of such inert substance is employed, the reaction may be conducted even under increased pressure, e.g., up to several atmospheres.

The important feature of the present invention is in the use of a particular catalyst. The catalyst is selected from organic acid salts. Examples of organic acids forming the catalyst salts are saturated and unsaturated mono- and di-carboxylic acids having 1–18 carbon atoms such as formic acid, propionic acid, crotonic acid, butyric acid, pivalic acid, valerianic acid, caproic acid, enantoic acid, caprylic acid, pelargonic acid, capric acid, undecylic acid, lauric acid, tridecylic acid, myristic acid, pentadecylic aid, palmitric acid, oleic acid, margaric acid, stearic acid, benzoic acid, oxalic acid, malonic acid, malein acid, fumaric acid, succinic acid, glutaric acid, adipic acid, pimelic acid, suberic acid, azelaic acid, sebacic acid, nonandicarboxylic acid, decandicarboxylic acid, undecandicarboxylic acid, terephthalic acid, etc. Substituted carboxylic acids such as glycolic acid,
lactic acid,
oxypivalic acid,
β-oxybutyric acid,
malic acid,
tartatric acid,
citric acid,
β-formyloxy-α,α-dimethylpropionic acid,
β-formyloxy-α,α-diethylpropionic acid,
β-acetoxy-α,α-dimethylpropionic acid,
β-acetoxy-α-methyl-α-ethyl propionic acid,
β-acetoxy-α-methyl-α-propylpropionic acid,
β-acetoxy-α-methyl-α-butylpropionic acid,
β-acetoxy-α-methyl-α-phenylpropionic acid,
β-acetoxy-α,α-diethylpropionic acid,
β-acetoxy-α-ethyl-α-propylpropionic acid,
β-acetoxy-α-ethyl-α-butylpropionic acid,
β-acetoxy-α-ethyl-α-phenylpropionic acid,
β-propionyloxy-α-methyl-α-ethylpropionic acid,
β-propionyloxy-α,α-diphenylpropionic acid may also be employed.

Metal salts of these organic acids show catalytic activity even when thermally decomposed at the reaction temperature employed.

Examples of metals which form the catalyst salts together with these organic acids are those metals belonging to Group I–VIII of Periodic Table, e.g., lithium, sodium, potassium, rubidium, cesium, beryllium, magnesium, calcium, strontium, barium, aluminium, gallium, indium, tin, lead, antimony, bismuth, titanium, vanadium, chrome, manganese, iron, cobalt, nickel, copper, zinc, molybdenum, rhodium, palladium, silver, cadmium, tungsten, thallium, cerium, boron, arsenic, zirconium, technetium, ruthenium, rhenium, osmium, tantalum, platinum, gold, mercury, etc.

These catalysts may be used as such or in the form as deposited in a well known manner on an inert carrier known in the art such as pumice, silica gel, diatomaceous earth, alumina, silica-alumina, active carbon. The catalyst may also be used in the form as dispersed in an inert medium of a high boiling point as exemplified before or as admixed with inert solid particles such as glass beads.

Any suitable reaction vessel or system such as fixed bed, moving bed, fluidized bed, foaming tower, reaction kettle may be employed in conducting the reaction.

The contact time in the present gas-phase catalytic reaction is not critical and may vary depending on the reaction temperature, pressure and the kind of the catalyst used. However, it is generally preferable that the contact time is relatively short, and it may range from 0.01 to 1 second, most preferably about 0.1 second.

Since the thus-produced β-lactone is easily changed under the present reaction conditions, it is desirable that the said β-lactone is quickly cooled. The thus-obtained product may be fractionated and rectificated under reduced pressure to obtain the β-lactone of high purity, and this can be utilized for polymerization and other applications.

As shown above, the process for preparing the said β-lactones by thermal decomposition catalyzed by a metal salt of an organic acid, of β-acyloxy-α,α-disubstituted-propionic acids is essentially different from the known methods employing expensive materials and may be advantageously carried out in a continuous manner using a simple apparatus. Furthermore, the present process may be simply and economically practiced on an industrial scale and thus is of great industrial value.

EXAMPLE 1

A flask (volume 1 liter) fitted with a thermometer and condenser was charged with a mixture of 160 g. of β-acetoxy-α,α-dimethyl propionic acid, 200 g. of dioctylphthalate (solvent) and 2.5 g. of lithium butyrate. The vessel was vacuumed to 15 mm. Hg and nitrogen gas was introduced therein. While stirring the reaction mixture the temperature was slowly raised to 230° C. to proceed the reaction. The vapor generated was cooled with air and then with water and collected in a trap cooled with a Dry Ice-methanol cooling medium. The main fraction was obtained at a temperature of 105–115° C. The whole reaction time inclusive the time for raising the temperature was 2 hours. The product collected in the trap was distilled and a fraction boiling at 45° C./10 mm. Hg was collected. The elementary analysis and infrared absorption analysis disclosed that the product was α,α-dimethyl-β-lactone and the by-product was acetic acid. The yield of α,α-dimethyl-β-lactone was 71.5%.

EXAMPLE 2

A celite powder (60 mesh) was impregnated with a potassium propionate aqueous solution and dried to obtain a catalyst powder containing 1% by weight of potassium propionate. 1.5 g. of this catalyst powder was packed in a glass tube of 15 mm. in diameter and 250 mm. in length, said catalyst being set at a distance of about 60 mm. from the outlet of the tube. The reactor was placed in a tubular electric furnace and heated to 300° C. Then, β-formyloxy-α-ethyl-α-phenylpropionic acid was charged into the reactor at a rate of 5.7 g. cat. min./m. mol (a reciprocal of the charged material in millimole per minute per gram of the catalyst) from an evaporator together with nitrogen gas. The pressure within the reactor was 10 mm. Hg. The gaseous product discharged from the glass tube reactor was cooled with air and then liquefied and collected in a trap cooled with a Dry Ice-methanol cooling medium. The product mixture collected in the trap was distilled and a fraction boiling at 105° C./1 mm. Hg was collected. The elementary analysis of the product disclosed that it is α-ethyl-α-phenyl-β-propiolactone. The yield of α-ethyl-α-phenyl-β-propiolactone was 80.1%.

EXAMPLE 3

The procedure of Example 2 was repeated except that various sodium salts of organic acids were used instead of potassium propionate and β-acetoxy-α,α-dimethyl propionic acid was fed into the reactor at a rate of 6.4 g. cat. min./m. mol and the reaction product mixture collected in the trap was distilled to obtain a fraction of 45° C./10 mm. Hg. The product thus obtained was, according to elementary and infrared absorption analysis, α,α-dimethyl-β-propiolactone. The by-product was acetic acid. The yields of the propiolactone were as follows:

| Sodium salt | Formate | Butyrate | Benzoate | Oxalate |
|---|---|---|---|---|
| Yield, percent | 72.5 | 83.5 | 79.4 | 75.2 |
| Sodium salt | Malonate | β-acetoxy-α,α-dimethyl propionate | β-acetoxy-α,α-dibutyl propionate | |
| Yield, percent | 80.1 | 89.2 | 88.1 | |
| Sodium salt | β-formyloxy-α,α-diethyl propionate | Glycolate | β-propionyloxy α,α-diphenyl propionate | |
| Yield, percent | 85.8 | 72.2 | 86.2 | |
| Sodium salt | None | | | |
| Yield, percent | 3.8 | | | |

EXAMPLE 4

In the same manner as in Example 3, β-acetoxy-α,α-diethylpropionic acid was thermally decomposed in the presence of various propionate catalysts indicated below.

The gaseous reaction product was collected in a cooling trap and subjected to distillation to obtain a fraction of 70° C./mm. Hg. As a result of analysis the resulting product in each case was identified to be α,α-diethyl-β-propiolactone. The yields were as follows:

| Propionate | Yield, percent | Propionate | Yield, percent |
|---|---|---|---|
| Lithium | 91.5 | Vanadium | 40.6 |
| Rubidium | 75.7 | Chromium | 35.2 |
| Cesium | 81.4 | Manganese | 41.8 |
| Beryllium | 75.4 | Iron | 49.6 |
| Magnesium | 77.7 | Cobalt | 47.8 |
| Calcium | 64.2 | Nickel | 44.2 |
| Strontium | 71.2 | Copper | 75.3 |
| Barium | 69.8 | Zinc | 50.3 |
| Aluminium | 50.2 | Molybdenum | 47.5 |
| Gallium | 55.4 | Rhodium | 33.2 |
| Indium | 50.1 | Palladium | 38.6 |
| Tin | 49.1 | Silver | 70.4 |
| Lead | 48.3 | Cadmium | 51.4 |
| Antimony | 35.6 | Tungsten | 35.3 |
| Bismuth | 51.2 | Thallium | 44.5 |
| Titanium | 55.3 | Cerium | 40.1 |
| None | 4.2 | | |

EXAMPLE 5

In the same manner as in Example 3, β-propionyloxy-α,α-dimethylpropionic acid was thermally decomposed in the presence of various butyrates (catalysts) indicated below.

The gaseous reaction product was collected in a cooled trap and subjected to distillation to obtain a fraction boiling at 45° C./10 mm. Hg. As a result of analysis, the resulting product in each case was identified to be α,α-dimethyl-β-propiolactone. The yields were as follows:

| Butyrate | Yield, percent | Butyrate | Yield, percent |
|---|---|---|---|
| Boron | 75.5 | Indium | 50.2 |
| Arsenic | 48.2 | Tantalum | 44.4 |
| Zirconium | 50.6 | Platinum | 65.2 |
| Technetium | 36.6 | Gold | 45.6 |
| Ruthenium | 44.8 | Mercury | 33.5 |
| Rhenium | 36.5 | None | 3.2 |
| Osmium | 42.6 | | |

What I claim is:

1. A method for producing an α,α-disubstituted-β-propiolactone of the formula:

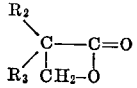

wherein $R_2$ represents an alkyl group of 1–4 carbon atoms and $R_3$ represents a group selected from the group consisting of alkyl groups of 1–4 carbon atoms and the phenyl group, which comprises thermally decomposing a β-acyloxy-α,α-disubstituted-propionic acid of the formula:

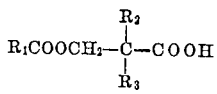

wherein $R_1$ represents a member selected from the group consisting of hydrogen atom and alkyl groups of 1–2 carbon atoms and $R_2$ and $R_3$ have the meanings above, in the presence of a catalyst selected from the group consisting of metal salts of saturated and unsaturated mono- and di-carboxylic acids having 1 to 18 carbon atoms, the metals being those belonging to Groups I–VIII of the Periodic Table.

2. A method as claimed in claim 1 in which the thermal decomposition is conducted at a temperature of 150–500° C., preferably at 200–300° C.

3. A method as claimed in claim 1 in which the thermal decomposition is conducted at a pressure of 1–760 mm. Hg, preferably 1–100 mm. Hg.

4. A method for producing an α,α-disubstituted-β-propiolactone of the formula:

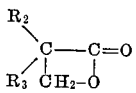

wherein $R_2$ represents an alkyl group of 1–4 carbon atoms and $R_3$ represents a group selected from the group consisting of alkyl groups of 1–4 carbon atoms and the phenyl group, which comprises thermally decomposing a β-acyloxy-α,α-disubstituted-propionic acid of the formula:

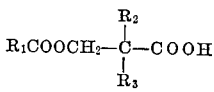

wherein $R_1$ represents a member selected from the group consisting of hydrogen atom and alkyl groups of 1–2 carbon atoms and $R_2$ and $R_3$ have the meanings above, in the presence of a catalyst selected from the group of metal salts of hydrocarbon mono- and di-carboxylic acids having 1 to 18 carbon atoms, of hydroxyalkyl carboxylic acids having 2 to 5 carbon atoms and of β-acyloxy-α,α-disubstituted propionic acids of the formula:

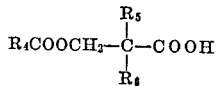

wherein $R_4$ represents a hydrogen atom or an alkyl group of 1 to 2 carbon atoms, $R_5$ and $R_6$ are each selected from the group consisting of alkyl groups of 1 to 4 carbon atoms and the phenyl group and may be the same or different, the metals being those belonging to Groups I–VIII of the Periodic Table.

References Cited

FOREIGN PATENTS 1,478,258  3/1967  France.

ALEX MAZEL, Primary Examiner

A. M. T. TIGHE, Assistant Examiner

U.S. Cl. X.R.

260—488, 535